3,285,000
TRANSMISSION
Howard W. Christenson and James J. Mooney, Jr., Indianapolis, and Robert H. Schaefer, Westfield, Ind., assignors to General Motors Corporation, Detroit, Mich., a corporation of Delaware
Continuation of application Ser. No. 293,619, July 9, 1963. This application June 4, 1965, Ser. No. 461,461
45 Claims. (Cl. 60—19)

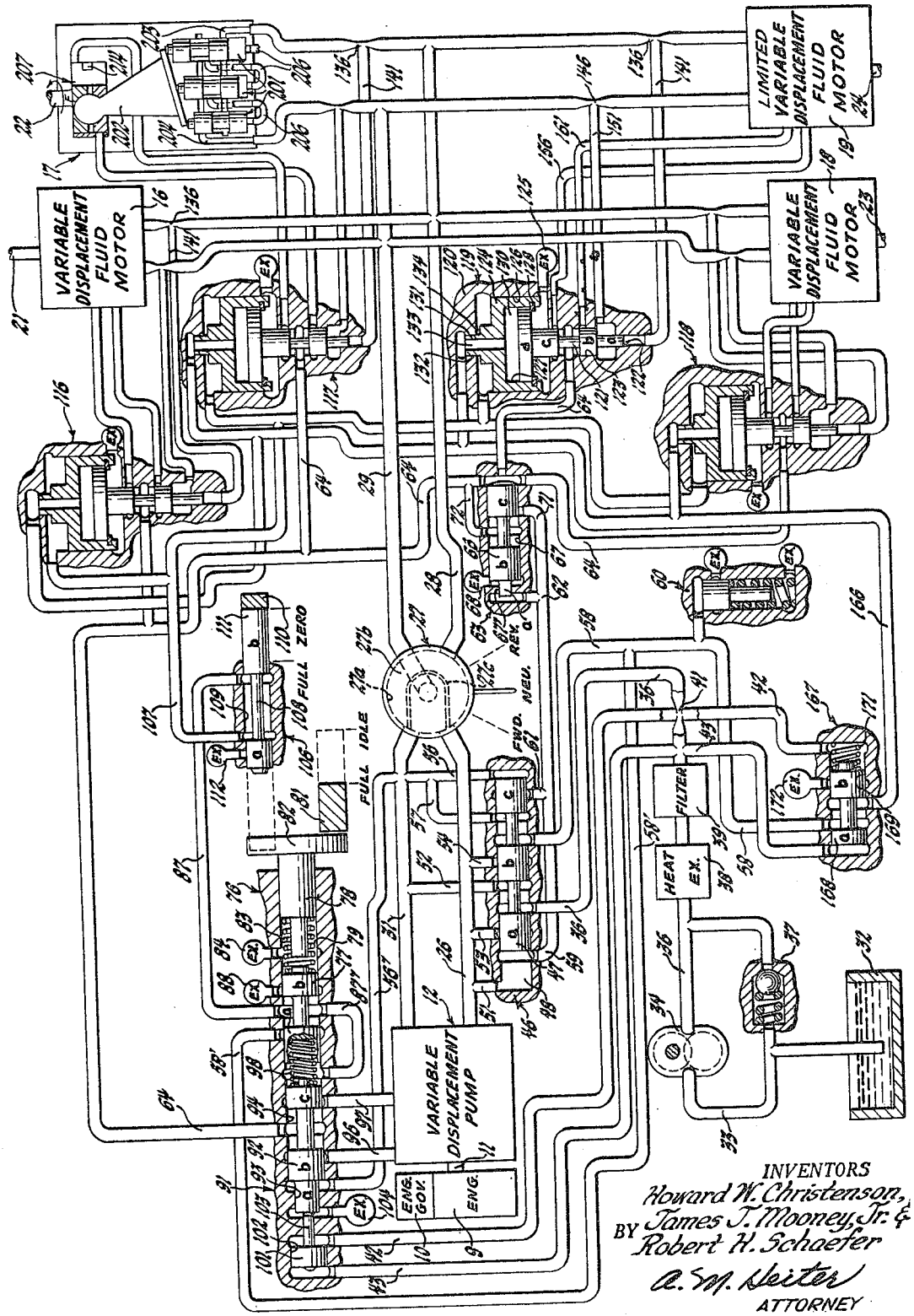

This invention relates to a vehicle and transmission and more particularly to a hydrostatic transmission and brake control system, and a continuation of the applicants' application Serial No. 293,619, filed July 9, 1963, and now abandoned.

A hydrostatic transmission power circuit illustrating the invention includes a variable displacement pump connected by a manual reversing valve to a plurality of variable displacement fluid motors. The pump displacement is controlled by increasing engine speed to increase displacement and increasing throttle pedal position to decrease displacement to provide a gradually increasing pump displacement to full pump displacement. The displacement of each of the motors is controlled by a motor displacement valve acted on by throttle pressure to decrease the displacement and by high power circuit pressure to increase the displacement. The system provides full motor displacement while the pump displacement is increasing and when the pump displacement has reached a maximum value, and at which point the system pressure reaches the minimum value, the motor displacement control valves thereafter reduce the motor displacement within limits to maintain a power circuit system pressure at a minimum proportional to throttle pedal position.

On application of the vehicle brakes the throttle pressure to the motor control valve is cut off to provide full motor displacement to pump a high volume of fluid to the pump to motor the engine. The pump displacement control valve is also acted on with an increasing force increasing with brake pedal position to reduce the pump displacement. This is preferably done by arranging the brake pedal linkage so that the linkage increases the throttle pressure in the same manner that the throttle linkage increases the throttle pressure. The high pressure in the power circuit under braking conditions acts on the pump displacement control valve to urge the valve to the increased displacement position to provide a force proportional to the brake pedal position. Thus increasing brake pedal position or brake demand proportionally increases pump inlet pressure during braking to increase engine braking to a maximum value as limited by maximum engine speed. At maximum engine speed during braking, the motor valves function to bypass the high power circuit pressure to the low power circuit pressure to provide additional hydraulic throttling braking transferring power to heat in the fluid which is dissipated by the whole system. It should be noted that as oil is bypassed from the high to the low pressure side during braking there is less quantity of oil flow available for motoring the engine at governed speed, so the pump displacement is further reduced and requires more and more pressure to maintain engine speed, until the pressure rises to a maximum limit of approximately 5000 p.s.i. At this pressure level the wheel torque is at its maximum rated value and would probably induce wheel slip and skid braking.

The flow in the power circuit to each motor is controlled by a venturi flow balancing system to reduce motor displacement to balance the flow to the motors to prevent loss of power by the motor carrying a load due to overspeeding of an unloaded motor.

An object of this invention is to provide in a hydrostatic transmission adapted to be driven by an engine, controls for automatically selecting the correct engine speed to provide optimum efficiency for each torque demand position and to automatically control the pump and motor displacement throughout the entire operating range to maintain the correct engine speed for optimum efficiency.

Another object of the invention is to provide in a hydrostatic transmission adapted to be driven by an engine, pump displacement controls balancing input speed and torque demand to control pump displacement, and motor displacement controls balancing power transmission fluid pressure and torque demand to provide optimum engine speed proportional to torque demand for maximum efficiency.

Another object of the invention is to provide in a hydrostatic transmission having a pump and a motor, control means responsive to brake demand to increase the motor displacement and decrease the pump displacement.

Another object of the invention is to provide in a hydrostatic transmission having a pump and a motor and adapted to be driven by an engine, transmission control means operative in response to brake demand to increase the motor displacement and to reduce the pump displacement in response to increasing brake demand as opposed by the power circuit pressure during brake operation.

Another object of the invention is to provide in a hydrostatic transmission having a pump and a plurality of motors, a venturi flow balancer in the power circuit connection to each motor to balance the flow to each motor to insure positive drive of each motor at substantially the same speed.

These and other objects of the invention will be more apparent from the following description and drawing of the preferred embodiment of the invention.

The drawing is a schematic showing of the power plant and hydrostatic transmission and the control system therefor.

Referring to the drawing illustrating a hydrostatic transmission employing the invention, the engine 9, which has a conventional throttle to control the fuel feed and a speed limiting governor 10 to limit the speed and a speed limiting governor 10 to limit the fuel feed and thus the speed to a maximum value, drives through shaft 11 the hydrostatic transmission variable displacement pump 12 which is connected by a power circuit, having supply and return lines, to drive the right variable displacement transmission motors 16 and 17 and the left variable displacement transmission motors 18 and 19 having output shafts respectively, 21, 22, 23 and 24 driving traction devices. The pumps and motors may be any suitable hydrostatic pump and motor transmission component which provide, on driving the shaft of a unit, a hydraulic output pressure and provide, on the supply of a hydraulic fluid under pressure to a unit, rotation of the shaft. Each unit also has means to vary the displacement. The preferred hydraulic pump and motor unit and the hydrostatic pump and motor assembly are disclosed in application S.N. 279,372, entitled "Transmission," filed by Howard W. Christenson et al. May 10, 1963.

Motor 17 illustrates a typical pump or motor construction. The motor 17 has four piston and cylinder valve assemblies 201 in conventional annular arrangement with the fourth in back of the center one. Each of the pistons engages the disc portion of the swash plate 202. The motor supply line 28 is connected to intake manifold 203 connected to the intake port of each cylinder. Each cylinder also has an exhaust port connected to an exhaust manifold 204 connected to return line 29. The passage 206 connects a controlled port in each cylinder located between the intake and exhaust ports to the closed end of the preceding cylinder, with reference to the forward direction of rotation of the motor. The ball end of swash plate 202 is universally mounted in the cylinder of displacement control motor 207 which is rotatably mounted on the output shaft 22 which is rotatably mounted in the housing. The stop 214 limits movement of the control piston in the control cylinder to limit minimum displacement. When fluid is supplied via line 28 the piston valves control flow from manifold port 203 to passages 206 to successively supply each cylinder to rotate the motor to drive shaft 22 as shown by the arrow F.

This new control system may be used in any hydrostatic transmission system having a pump and motor or motors each of which is provided with hydraulic displacement control and a power circuit connecting the pump and motor as shown, for example, in Wahlmark 2,373,723 and 2,383,092 and Norman 2,431,071.

The pump and motors are connected by a hydraulic power circuit. The pump 12, when driven by the engine, supplies fluid under pressure to the pump outlet line 26 which is connected by the manual reversing valve 27 when in the forward position to the motor supply line 28, which is connected to each of the motors. The return fluid in the power circuit is conducted from the motors when driving forward by the return line 29 which is connected through the reversing valve 27 to the pump inlet line 31. In neutral position, shown, the reversing valve 27 interconnects the pump outlet and inlet lines and the motor supply and return lines to permit freewheeling of the transmission. In reverse position, the reversing valve connects the pump outlet line 26 to the motor return line 29 to drive the motors in reverse direction and connects the fluid returning via the motor supply line 28 to the pump inlet line 31. A conventional reversing valve is shown in the above S.N. 279,372, and an improved valve in S.N. 306,436, entitled "Valve," filed by Howard W. Christenson et al. September 4, 1963. The reversing valve 27 has a cup-shaped body 27a with ports in the side wall to receive lines 26, 28 and 31 located, as shown, and a port in the center of the base to receive line 29. The cover 27b seals the top of the cup body base and has an L-shaped passage 27c selectively connecting the ports for lines 31 and 26 in forward and reverse, respectively, to the port in the base connected to line 29. When one of the lines 31 and 26 is connected by passage 27c to line 29, the other is connected by the space in the cup to line 28. In neutral, passage 27c partially overlaps ports for lines 26 and 31 to interconnect all four lines.

Charging and make-up fluid is supplied to the power circuit to charge and make up leakage and control fluid is supplied to the control system from a sump 32 located in the base of the housing for pump 12 via the pump inlet line 33 by the charge pump 34, which is driven by the engine 9 proportional to engine speed, to supply fluid to the main line 36. A pressure release valve 37, connected to main line 36, regulates the pressure or limits the pressure in the main line 36 to a maximum value and returns the excess to inlet line 33 or sump 32. Main line 36 also has a heat exchanger 38 and a filter 39 therein.

A venturi 41, located in the main line 36, provides a low and high governor pressure. The lower pressure governor line 42, which is connected to the throat of the venturi, provides the lower governor pressure which decreases with increasing flow through the venturi due to increasing speed of pump 34 or engine speed. The high pressure governor line 43 is connected to the main line 36, just upstream of the venturi 41, to provide a high governor pressure increasing with increasing pump or engine speed.

*Cooling supply valve*

The cooling supply valve 46 is employed to supply make-up fluid to the power circuit and has a valve element 17 having lands *a*, *b* and *c* of equal diameter located in a closed bore 48. In the forward drive position, the high pressure pump outlet line 26 is connected by branch 51 to the left end of the bore 48 and acts on land *a* to move the valve to the position shown where the main line 36 is connected between the lands *a* and *b* to the branch 52 to supply fluid to the pump inlet line 31. The branches 53 and 54 are closed, respectively, by the lands *a* and *b*. The pump inlet line 31 has branches 56 and 57 connected to the line at a common point with branch 56 connected to the end of the bore acting on the land *c*. Since pressure in the inlet line 31 is substantially less than the pressure in the outlet line 26, this pressure conducted by branch 56 to act on land *c* cannot overcome the higher pressure in line 26 acting on land *a* and the valve position is not affected. Branch 57 is connected between the lands *b* and *c* to the control line 58 and the pressure in this line is limited to a low value, i.e., 100 p.s.i., by the regulator valve 60. The high pressure from the pump outlet line 26 is also connected by branch 51, bore 48 and branch 59 to the displacement control feed line 62.

When the motors are overrunning the engine, the motor return line 29 has a higher pressure than the motor supply line 28 of the power circuit. Then the high pressure in branch 56 acting on the land *c* moves the valve to the opposite end of the bore connecting the main line 36 between the lands *a* and *b* and branch 53 to the lower pressure pump outlet line 26 where fluid is flowing from the pump to the motor. Branches 57 and 52, connected to the pump inlet line 31, are blocked respectively by the lands *b* and *c*. Branch 54 connects pump outlet line 26 between the lands *b* and *c* to supply low pressure via line 58 which is regulated by valve 60 to prevent it exceeding 100 p.s.i. The high pressure from line 31 is connected by branch 56 through the bore to the branch 61 to control feed line 62.

*Pressure relay valve*

The control feed line 62 is connected to the pressure reducing valve 63 to supply a proportionate pressure, i.e., one-tenth pressure (100 to 500 p.s.i.), to the displacement control line 64. The pressure reducing valve 63 has a valve element 66 having large lands *b* and *c* located in large bore 67, and a small land *a* located in small bore 67'. Line 62 is connected to one end of the closed bore to small bore 67' to act on the land *a* and the displacement control line 64 is connected at the opposite end to act on the land *c*. The exhaust 68 vents the space between the lands *a* and *b*. When the pressure in line 64 is the proper proportion of the feed pressure in line 62, this pressure acting on land *c* will hold the valve element 66 in the position shown with land *c* blocking the branch 71 of line 62. When pressure in line 64 drops, due to use of oil and/or leakage, the valve is moved to the right by feed pressure from line 62, and connects line 62 via branch 71 between the lands *b* and *c* and via branch 72 to the line 64. It will be noted that this valve does not provide an exhaust for the line 64. There is sufficient leakage in the system and proper operation will be maintained even though under pressure reduction of the high pressure in the power circuit the reduction of the control pressure in line 64 lags.

*Throttle valve*

The throttle control valve 76, providing a throttle pressure proportional to torque demand or throttle position, has a regulator valve 77 having lands *a* and *b* and a plunger 78 located in a bore 79 of uniform diameter. A lever member 81 which is part of the fuel or throttle control linkage and is movable from the engine idle position (idle), shown in dotted lines, to the engine full throttle position (full), as shown, cooperates with the head 82 of plunger 78 to increase the biasing force of spring 83 acting on the regulator valve element 77 with increasing fuel supply to the engine. The displacement valve spring 98 acts on the regulator valve 77 to provide a small return force sufficient at idle or zero throttle position to return the throttle regulator valve to the closed position for zero throttle pressure. Exhaust 84 vents the space between valve element 77 and plunger 78. When the throttle pressure in throttle pressure line 87 has the desired proportion to the throttle control position, throttle pressure connected by branch line 87' to bore 79 acts on the left end of land *a* and with spring 98 balances the biasing force of spring 83, the valve is in the closed position blocking low pressure feed line 58' with land *a* and exhaust 88 with land *b*. On an increase of the biasing force or a decrease in throttle pressure, valve element 77 will move to the left connecting the feed line branch 58' to the throttle line 87 and blocking exhaust 88. On a reduction in throttle position to provide a reduction in throttle pressure, the feed line 58' is blocked and the throttle line 87 is connected to exhaust 88. The throttle pressure increases in proportion to increasing engine throttle position or torque demand.

*Pump displacement control valve*

The pump displacement control valve 91 controls the displacement of the transmission power pump and has a valve element 92 having a small land *a* located in bore portion 93 and lands *b* and *c* of equal diameter located in a bore 94. In the neutral position of this valve, as shown, the displacement control line 64 is connected to a space between lands *b* and *c* and blocked by land *b* from the decrease pump displacement line 96 and by land *c* from the increase pump displacement line 97. The valve element 92 is biased to the left or decreased displacement position by spring 98 located between the displacement control valve 92 and the throttle pressure regulator valve 77, and by the throttle pressure supplied by line 87' also acting between these valves to connect control line 64 to decrease displacement line 96. A governor plug 101 is located in a coaxial spaced bore 102 that is closed at both ends. The plug has a stem 103 acting on or fixed to the left end of land *a* of valve element 92. The stem 103 freely moves in an aperture in the wall between bores 93 and 102. The wall and stem prevent passage of fluid between these bores, and the bore 93 is provided with exhaust 104 at this wall. Since the high governor pressure supplied by line 43 to act on the end face of plug 101 increases with increasing engine speed and is always greater than the low governor pressure, which decreases with increasing engine speed, and is supplied by line 42 to the right end of this plug and the high governor pressure acts on a larger area, the combined governor pressures act to the right to move the valve element 92 to an increased displacement position with increasing speed connecting control line 64 to increase displacement line 97. The pump inlet line 31 of the power circuit is also connected by a branch line 56' to the space between the lands *a* and *b* to bias the valve 92 for increased displacement. On an increase of the throttle control to supply more fuel to the engine 9 for increased torque demand, the throttle pressure via line 87' moves pump displacement valve 92 to the decreased displacement position unloading the engine and permitting engine speed to increase. With increased engine speed, the high governor pressure increases and the low governor pressure decreases to move valve 92 to the increased displacement position. The normal operation on increasing the throttle finally results in increasing the engine speed and pump displacement.

*Brake valve*

The throttle pressure line 87 is connected through the brake valve 106 to the brake controlled throttle line 107, when the brake is released. The brake valve 106 has a valve element 108 having lands *a* and *b* of equal diameter located in a bore 109. A brake pedal is connected by suitable linkage 110 to the operating end 111 of the brake valve to position the valve 108 as shown in the brake release or zero brake position in which the valve connects the throttle pressure line 87 between the lands *a* and *b* to the brake control throttle pressure line 107. When the brake is applied, the brake linkage moves the valve 108 toward the full brake applied position indicated by the word "full." On the initial increment of movement of valve 108, the land *b* blocks the throttle pressure line 87 and the brake controlled pressure line 107 is connected to exhaust 112 to disconnect throttle pressure from the motor displacement control valves. The brake valve element 108 also engages the throttle valve head 82 to move the throttle valve to increase throttle pressure with increasing brake application or brake demand.

*Motor displacement valves*

There is a motor displacement valve 116, 117, 118 and 119, respectively, connected to each of the motors 16, 17, 18 and 19. The motors on at least one axle, such as motors 16 and 18, are blocked so that displacement reduction is limited to a low value, i.e., one-fourth displacement. Since each of these valves is constructed in the same manner, the following description and reference numerals applies to each motor displacement valve. The valve element 121 has a land *a* of small diameter located in a small bore portion 122, lands *b* and *c* of intermediate equal diameter located in an intermediate diameter bore portion 123, and a large land *d*. An auxiliary valve element 124 is located in a large bore portion 126 and has a large internal bore open at one end in which a land *d* reciprocally fits to provide a sealed chamber. Relative reciprocating movement of the land *d* and its associated valve element 121 with respect to the auxiliary valve element 124 is limited by a snap ring 128 at the open end of the internal bore 127 and the opposite end of bore 127 of the auxiliary valve element 124. The auxiliary valve element 124 has extending from the opposite side a stem 131 of small diameter fitting into the small diameter bore 132 and a passage 133 connected through the stem to the bore 127. The bores 122, 123, 126 and 132 in the valve body 120 and bore 127 in auxiliary valve element 124 are coaxial. The motor supply line 28 has in the connection to each motor a venturi 136 with a supply flow signal line 141 connected to the throat of the venturi to provide a pressure inversely proportional to flow. The supply flow signal line is connected to the bore 122 of the respective motor displacement valve to act on the end of land *a*. There is a similar venturi 146 in each of the branches of return line 29 connected to each motor. The return flow signal line 151 is connected to the throat of each venturi 146 in the return line branches at each motor and also to the space 125 between the bores 122 and 123 to act on the differential area of land *b*. The differential area of land *b* is the same as the area of land *a*. The displacement control pressure line 64 is connected to the valve bore 123 between the lands *b* and *c* with the valve in normal position, shown, and on upward movement connects this control feed line to the more displacement line 156 for each motor and on downward movement to the less displacement line 161 for each motor. The exhaust 125 vents fluid in the bore 126 between both valve element 121 and the auxiliary valve element 124 and the shoulder between bores 126 and 123. The brake controlled throttle pressure line 107 is connected to the upper end of bore 126 of each motor displacement valve to act on the upper face of auxiliary valve element 124. The governor signal pressure is a line pressure supplied at all normal operating speeds via line 166 and is connected to the bore 132 of each valve element and passes through the passage 133 to the sealed chamber between the auxiliary valve element 124 and the land *d* of the valve element 121 to normally hold the two valve elements in the extended position shown. With the valve elements extended by governor signal pressure, the shoulder 134 engages the upper end of bore 126 to limit movement of the two element valve assembly to prevent land *a* from moving out of bore 122 and connecting the supply and return flow signal lines. Whenever the engine speed exceeds a safe value, the governor relay valve 167 exhausts governor signal line 166 to permit the motor control valves to contract to reduce the length of the two-unit valve assembly to interconnect the supply and return flow signal lines 141 and 151 to provide hydraulic braking as explained below.

In each of the motor displacement valves 116 to 119, the flow signal pressure, which varies directly with the pressure and inversely with flow in the respective motor supply and return lines is connected respectively to act on the lands *a* and *b* of valve element 121 to urge the valve element in an increased displacement direction. The throttle pressure acting on the upper face of auxiliary valve element 124 tends to move the motors in a decreased displacement direction.

The power circuit pressure is limited to a maximum value, i.e., 5000 p.s.i., by the motor displacement valves. When the power circuit pressure reaches this maximum value, the flow signal pressures, acting on lands *a* and *b* of valve element 121, will provide a force sufficient to collapse the valve assembly moving valve element 121 into auxiliary valve element 124 expelling the low pressure, i.e., 100 p.s.i., fluid from chamber 130 and moving land *a* out of bore 122 to connect the higher pressure line of motor supply line 28 and motor return line 29 to the lower pressure, i.e., 100 p.s.i., line.

Governor relay valve

The governor relay valve 167 has a valve element 168 having lands *a* and *b* located in a bore 169. The spring 171 biases the valve element 168 to the position shown connecting the low pressure feed line 58' to the governor signal line 166. When the governor pressure exceeds a value indicating that the engine is operating at a speed in excess of the particular design speed, such as the full power speed or a safe speed, the high governor pressure in line 43 overcomes the low governor pressure in line 42 and the biasing force of spring 171 to move the valve element 169 to the right so that land *a* blocks line 58 and governor signal line 166 is connected between the lands to exhaust 172.

Operation

When the manual valve 27 is in the neutral position, the pump outlet line 26, pump inlet line 31, motor supply line 28 and motor return line 29 forming the power circuit are interconnected at the valve to unload the pump 12 and all motors 16, 17, 18 and 19 so no power can be transmitted in either direction. This completely unloads the engine 10 and permits freewheeling of the output or vehicle for coasting and towing.

For forward drive, the manual valve 27 is moved to the forward position FWD connecting pump outlet line 26 to motor supply line 28 and the motor return line 29 to the pump inlet line 31. With the engine idling and the throttle control in idle position, the pump displacement control valve 91 will be in the decreased displacement position holding the transmission pump 12 at zero displacement so no fluid under pressure is supplied to the power circuit by pump 12. The pump displacement valve 91 is held in the decreased displacement position by the spring 98 since the very low governor pressures acting on governor plug 101 and the low, i.e., 100 p.s.i., pump inlet pressure supplied by line 56' and acting on land *b* are insufficient to move the valve against spring 98. At engine idle speed, the engine driven pump, which supplies a volume of fluid proportional to engine speed, supplies a low volume of fluid so the flow through venturi 41 is low and there is little difference between the high and low governor pressures and only a small force exerted on governor plug 101. The pump 34 via main line 36 and cooling valve 46 in either position fills the power circuit with a low pressure, i.e., 100 p.s.i., which acts via line 56' on the small area of land *b*. Both of these pressures are insufficient to overcome spring 98, so pump displacement valve is in decrease position and the pump at zero displacement.

To transmit power, the throttle is increased to supply more fuel to the engine to increase engine speed and to actuate throttle valve 76 to increase throttle pressure in line 87 and 87'. The increased throttle pressure initially tends to decrease displacement, but the resulting increased engine speed increases the governor pressure sufficiently to overcome the throttle pressure and the biasing spring 98 to move the displacement valve to increase pump displacement at full power gradually to maximum pump displacement. With increasing throttle position and engine speed throttle pressure and governor pressure balance the pump displacement control valve 91 to control the pump displacement to maintain the proper engine speed proportional to the torque demand as indicated by the throttle position or throttle opening for maximum engine efficiency at each throttle opening.

The operation at partial power requirements is similar, but the pump displacement would only increase to a pump displacement value proportionate to the power requirement. For example, at half power, the pump displacement would increase to half pump displacement at about one-fourth throttle opening and thereafter remain constant at half pump displacement.

As the pump displacement increases, the volume of oil pumped by the pump increases and is supplied to the motors. With the engine idling, the charge pump 34 having filled the power circuit and the control circuit as explained above, the motor displacement control valves 116, 117, 118 and 119 will place the respective motors 16, 17, 18 and 19 in the maximum displacement position. The motor displacement control valves will be in the increased displacement position connecting the control feed line 64 to the increased motor displacement line 156 to provide full motor displacement since the charging pressure regulated by regulator valve 60 at a low value, i.e., 100 p.s.i., in the power circuit is connected from the motor supply line 28 via the venturi 136 and signal line 141 to act on the end of the land *a* and from the motor return line 29 via venturi 146 and signal line 151 to act on the land *b* to place the valve to the increased displacement position. At this time, since the engine is not overspeeding, the low control pressure in line 58 regulated by valve 60 at a low value, i.e., 100 p.s.i., is connected by governor valve 167 via governor line 166 to the chamber 130 to place the two-part motor displacement valve assembly in the extended position. The governor pressure 166 supplied to the chamber 130 of the valve assembly, which holds the valve assembly in expanded position, also has a component acting to move the valve assembly to a decreased displacement position, but since the stem 131 and the passage therein 133 is kept small compared to the total area of lands *a* and *b*, the unbalanced fluid force acting on the stem 131 tending to move the valve to the decreased displacement position is small compared to the force provided by the same pressure acting on the lands *a* and *b* to move the valve to the increased displacement position. The shoulder 134 abuts the end wall of bore 126 to keep land *a* and bore 122 to prevent an interconnection between the signal lines 141 and 151. At idle, the throttle pedal is zero or very low and thus the connection of the throttle pressure via line 87 and 107 to the end of the bore 126 acting on the auxiliary valve element 124 does provide a force sufficient to move the motor controlled valve to the decreased displacement position. Thus the valve under idling conditions will be in the increased displacement position.

As the throttle is advanced to increase engine speed, pump displacement increases to increase the flow of fluid in the power circuit to the motors, the pressure in the power circuit immediately rises to a high maximum value, i.e., 5000 p.s.i., as explained above by the motor displacement valves, to provide a high starting torque to start the load or vehicle. As the throttle is advanced up to half throttle increasing the pump displacement as explained above, the motors accelerate the load or vehicle increasing its speed and the pressure in the power circuit decreases quickly at first and then at a progressively slower rate on a curve similar to the transmission torque curve. In forward drive, the high pressure in the motor supply line 28 is connected at the throat of venturi 136 to signal line 141 to provide a pressure acting on the land $a$ of the motor displacement valve to move the motor displacement valve to an increased displacement position. This pressure is proportional to the power circuit pressure and inversely proportional to the flow of fluid to the motor. The throttle pressure, which increases with increased throttle opening, acts on the auxiliary valve element 124 to move the motor valve to the decreased displacement position. In the lower portion of the throttle range, for example, to half throttle, and while the power system pressure is above a minimum value, i.e., 1500 p.s.i., the power system force acting on the motor displacement control valve overcomes the throttle force and holds the motor displacement valve in the increased displacement position to maintain the motor in the full displacement position. When the power system pressure tends to fall below 1500 p.s.i., full power half output speed, the throttle pressure overcomes the power circuit pressure acting on the motor displacement valve and moves the motor displacement valve to decrease the motor displacement. At full throttle, the balance of the throttle pressure and power circuit pressure on the motor displacement valve will gradually reduce the motor displacement between a mean throttle position, i.e., half throttle and full throttle, to maintain a constant minimum power system pressure, i.e., 1500 p.s.i. At reduced throttle openings, a proportionately lower power system pressure will be maintained by further reducing the motor displacement. At part throttle operation, it is preferred that two of the motors 16, 18 do not have a stop 214 so that they may reduce to zero displacement and thus cease driving. The displacement reduction of another pair of motors, each having a stop 214, will be limited to a low value, i.e., one-fourth displacement, to insure continuous drive without freewheeling and to motor the engine for braking service.

For reverse drive, the manual valve 27 is moved to the reverse position REV to connect the pump outlet line 26 to the motor return line 29 to drive the motors in the reverse direction. Then the motor supply line 28 acts to return the fluid via manual valve 27 to the pump inlet line 31. Since the return line 29 is now the high pressure line supplying power circuit fluid to the motors, the power circuit signal to the motor displacement control valves is obtained from the venturi 146 in the power circuit connection of line 29 to each motor and conducted by the signal line 151 to the bore 125 to act on the land $b$ of the motor displacement control valve for each motor. In all other respects the system operates in reverse in the same manner as explained above for forward drive.

For normal braking operation, the brake pedal is actuated to move the portion of the brake linkage 110 which first operates the brake valve 106 to cut off the flow of throttle pressure from line 87 to line 107 and to vent the line 107 removing throttle pressure from the motor displacement valves. Then the power circuit pressure acting on lands $a$ and $b$ of the motor displacement valves moves the valves to the increased displacement position to increase the displacement of the motors to maximum displacement so that they deliver maximum oil flow due to the rotation of the load or movement of the vehicle. The increased oil flow from the motor pressurizes return line 29 of the power circuit which is connected by manual valve 27 to the pump inlet line 31 to motor the pump and engine. The movement of the valve element 108 of the brake valve 106 also causes the end at land $a$ of brake valve element 108 to engage the head 82 of the throttle valve 76 to increase the throttle pressure in line 87′ proportional to the brake demand during full brake control movement. This brake demand pressure on the pump displacement valve 91 acts to move the pump displacement valve to the decreased displacement position. The increased pressure in pump inlet line 31 due to the rotation of motors is connected by line 56′ to act on the land $b$ of the pump displacement valve 91 to oppose the increased brake demand force. Since the pressure line 56′ is a measure of the braking effort or brake effort being provided by the engine and the throttle valve pressure is a measure of the brake pedal position or brake demand, the pump displacement valve 91 will adjust the pump displacement to motor the engine at a speed consistent with brake pedal position thus increasing the braking effort with increased brake pedal position. As increased braking is desired, the brake pedal is further depressed to further increase throttle pressure and the pump control valve 91 continues to further reduce the pump displacement thereby raising the pressure required to motor the engine at governed speed and increasing the resulting brake torque. The maximum braking torque is limited by the maximum pressure on the wheel motors. Thus the full design braking torque is available at any vehicle speed. The engine is motored at governed speed during extended braking to provide maximum engine braking. This speed obtains maximum friction horsepower or braking effort from the motor before further braking is obtained by dissipating heat through the regulator or motor displacement valves and also insures maximum cooler flow for extended brake operation. The heat energy from braking is dispersed through the entire hydraulic system rather than being concentrated on a few surfaces. Consequently the thermal inertia is higher than in conventional brakes. However, adequate cooling must be provided by the heat exchanger 38 and the cooling control valve 46 which circulates fluid through the heat exchanger during braking operation as explained above. Since during this engine braking operation the pump speed is always in the high portion of the speed range and generally at maximum engine speed for maximum braking, the governor pressure acting on the pump displacement valve is fairly constant. However, as the governor bias on this valve decreases with decreasing engine speed like the braking effect, the governor pressure also provides a bias proportional to braking effort opposing the brake demand bias provided by brake lever 110.

When during braking operation the engine speed reaches the governed limit, the governor valve 167 dumps the governor pressure in line 166 to exhaust 172 to exhaust the chamber 130 of the motor displacement valves permitting the two-part motor displacement valve assembly to contract to withdraw the land $a$ from the bore 122 to interconnect the flow signal lines 141 and 151 to permit flow from the higher pressure return line 29 via signal line 151 through the motor displacement valve to line 141 and the lower pressure supply line 28. This by-passing of the high pressure side of the power circuit to the low pressure side through a throttle passage provides additional braking effort and reduces the power circuit flow so less fluid pumped by the motors is supplied to the pump 10 and thus the engine speed is reduced.

The venturi flow balancer insures positive drive to each wheel under uneven traction conditions. When the transmission is operating in forward, as explained above, the motor supply passage 28 conducts high pressure power circuit fluid to each of the motors. In the branch line connected to each motor there is a venturi 136 which, at its throat, has a connection to the flow signal line 141 which is operative on the land $a$ of the motor displacement valve for the associated motor. When the load on a driving motor is released, which would occur in a vehicle for example when a wheel loses traction, the motor would speed up under no load conditions and there will be a high rate of fluid flow in the branch of line 28 to that motor through the venturi 136 reducing the pressure in line 141 to the motor displacement control valve for the overspeeding motor. When the flow signal pressure acting on land *a* of the motor displacement valve is reduced, and the throttle pressure acting on valve element 124 remains constant, the motor displacement valve assembly will be moved toward the decreased displacement position thus reducing the displacement and power to the overspeeding motor. This reduction of the oil power to the unloaded and overspeeding motor helps to distribute the load or obtain better traction to drive the load and prevents loss of power to the other motors due to bypassing of power circuit fluid through an overspeeding motor.

During reverse operation the venturi flow balancing system will work in the same manner except that the supply to the motors is now conducted through return line 29, which also has in each branch a venturi 146 in the branch to each motor, and a flow signal line 151 from the throat of this venturi to act on the land *b* of the associated motor displacement valve for each motor. When this pressure on the motor displacement valve drops, the throttle pressure will similarly reduce the motor displacement.

In this control system, during forward and reverse operation, the throttle pressure balances the quantity of oil pumped with the quantity of oil used in each motor at all times. The controls automatically select the correct engine speed to provide optimum efficiency for each throttle position and automatically control the pump and motors throughout the entire vehicle operating range to maintain this engine speed. The venturi flow balancing system described above provides an interwheel differential action. If one motor output or wheel loses its load as by loss of traction, there is a flow interlock that insures positive drive power to each wheel. The flow balancing system prevents one motor running away and using all the oil provided by the pump at an excessive speed and slows down the rotation of this motor and associated wheel to obtain better traction. Thus the wheels that have traction will be maintained at the normal displacement value providing the proper speed and the speed of the wheel losing load will be reduced by reducing the displacement substantially to the same power value.

The above described preferred embodiment is illustrative of the invention which may be modified within the scope of the appended claims.

We claim:

1. In a hydrostatic transmission;
   (a) a fluid pump and motor combination having drive means, a plurality of driven means, pump means driven by said drive means, a plurality of motor means each driving one of said driven means and power circuit means connecting said pump and motor means to supply fluid from said pump means to each of said motor means and return fluid from each of said motor means to said pump means, and each of said motor means having motor displacement varying means to vary the displacement of said motor means;
   (b) and means connected to said power circuit means and said motor displacement varying means operative in response to increased flow in said power circuit means to a motor to reduce the displacement of a motor receiving increased flow.

2. In a hydraulic transmission;
   (a) a pump having drive means, pumping means driven by said drive means, and a fluid inlet and a fluid outlet;
   (b) a plurality of motors each having driven means, motoring means for driving said driven means, displacement varying means to vary the displacement of the motoring means and a fluid inlet and a fluid outlet;
   (c) power circuit means interconnecting said pump and each motor inlet and outlet to supply fluid from said pump to each of said motors and return said fluid from each of said motors to said pump;
   (d) flow signal means connected to said power circuit for providing a flow signal proportional to the flow to each motor;
   (e) and motor displacement control means connected to said motor displacement varying means for each motor and said flow signal means and being operative to provide decreased pump displacement for each motor in response to increased flow to that motor.

3. In a hydraulic transmission;
   (a) a pump having drive means, pumping means driven by said drive means, displacement varying means to vary the displacement of said pump means and a fluid inlet and a fluid outlet;
   (b) a motor assembly having driven means, motoring means driving said driven means, displacement varying means to vary the displacement of said motoring means and a fluid inlet and a fluid outlet;
   (c) power circuit means interconnecting said pump and motor inlets and outlets to supply fluid from said pump to said motor and return fluid from said motor to said pump;
   (d) torque demand means for controlling the torque demand of an engine movable from a low to a high torque demand position for providing a torque demand signal proportional to torque demand;
   (e) governor means connected to said pump and responsive to the speed of said pump for providing a signal proportional to pump speed;
   (f) flow signal means connected to said power circuit for providing a flow signal directly proportional to the power circuit pressure and inversely proportional to the flow to said motor;
   (g) pump displacement control means connected to said pump displacement varying means, said governor means and said torque demand means and operative to increase pump displacement with increasing speed and to decrease pump displacement with increasing torque demand;
   (h) and motor displacement control means connected to said motor displacement varying means, said torque demand means and said flow signal means and operative to provide decreasing motor displacement with increasing flow signal and to provide increasing motor displacement with increasing torque demand.

4. In a hydraulic transmission;
   (a) a pump having displacement varying means to vary the displacement of the pump and having a fluid inlet and outlet;
   (b) a motor having displacement varying means to vary the displacement of the motor and having a fluid inlet and outlet;
   (c) power circuit means interconnecting said pump and motor inlets and outlets to supply fluid from said pump to said motor and return fluid from said motor to said pump;
   (d) torque output demand means for controlling the torque output demand of an engine movable from a low to a high torque demand position;
   (e) torque absorption demand means for controlling the torque absorbed by an engine;
   (f) torque signal means connected to said torque output demand means and said torque absorption demand means for providing a torque signal proportional to torque output demand and torque absorption demand;
   (g) governor means connected to said pump and responsive to the speed of said pump for providing a signal proportional to pump speed;
   (h) pressure signal means connected to said power circuit providing a pressure proportional to power circuit pressure;
   (i) flow signal means connected to said power circuit for providing a flow signal directly proportional to the power circuit pressure and inversely proportional to the flow to said motor;
(j) pump displacement control means connected to said pump displacement varying means, said pressure signal means, said governor means and said torque demand means and operative in response to operation of said torque output demand means to increase pump displacement with increasing speed and to decrease pump displacement with increasing torque output demand and operative in response to torque absorption demand to increase pump displacement with increased power circuit pressure and pump speed and to decrease pump displacement with increased torque absorption demand;
(k) and motor displacement control means connected to said motor displacement varying means, said torque demand means and said flow signal means and operative in response to operation of said torque output demand means to provide increasing pump displacement with increasing flow signal and to provide decreasing motor displacement with increasing torque demand and operative in response to operation of said torque absorption demand means to provide increasing motor displacement with increasing flow signal.

5. In a hydraulic transmission;
(a) a pump having drive means, pumping means driven by said drive means, displacement varying means to vary the displacement of the pumping means and a fluid inlet and a fluid outlet;
(b) a motor having driven means, motoring means for driving said driven means, displacement varying means to vary the displacement of the motoring means and a fluid inlet and a fluid outlet;
(c) power circuit means interconnecting said pump and motor inlets and outlets to supply fluid from said pump to said motor and return fluid from said motor to said pump;
(d) brake torque demand means for controlling the torque absorption by an engine from said driven means movable from a low to a high brake torque demand position for providing a brake torque demand signal proportional to brake torque demand;
(e) governor means connected to said pump and responsive to the speed of said pump for providing a signal proportional to pump speed;
(f) pressure signal means connected to said power circuit means providing a pressure proportional to said power circuit pressure;
(g) flow signal means connected to said power circuit for providing a flow signal directly proportional to the power circuit pressure and inversely proportional to the flow between said pump and motor;
(h) pump displacement control means connected to said pump displacement varying means, said governor means, said pressure signal means and said brake torque demand means and operative to increase pump displacement with increasing speed and increasing circuit pressure and to decrease pump displacement with increasing brake torque demand;
(i) and motor displacement control means connected to said motor displacement varying means and said flow signal means and operative to provide increased pump displacement in response to said flow signal.

6. In a hydraulic transmission;
(a) a fluid pump and motor unit having drive means, driven means, pump means driven by said drive means, motor means driving said driven means, power circuit means connecting said pump and motor means to supply fluid from said pump means to said motor means and return fluid from said motor means to said pump means, and pump displacement varying means to vary the displacement of said pump means;
(b) output torque demand means for controlling torque demand of an engine movable from a low to a high torque demand position for providing a torque demand signal proportional to torque demand;
(c) brake torque demand means for controlling the torque absorption by an engine from said driven means movable from a low to a high brake torque demand position for providing a brake torque demand signal proportional to brake torque demand;
(d) governor means connected to said pump means and responsive to the speed of said pump means for providing a speed signal propotional to pump speed;
(e) pressure signal means connected to said power circuit to provide a pressure signal proportional to power circuit return pressure;
(f) pump displacement control means connected to said pump displacement varying means, said governor means, said output torque demand means, said brake torque demand means and said pressure signal means and operative in response to operation of said output torque demand means to increase pump displacement with increasing speed signal as opposed by output torque demand signal to control the pump speed to provide optimum operating conditions for an engine driving the pump means, and operative in response to operation of said brake torque demand means to decrease pump displacement with said brake torque demand signal as opposed by said speed signal and said pressure signal to provide increased torque transmission from the driven means to said drive means.

7. The invention defined in claim 6 and said output torque demand means and said brake torque demand means including a regulator valve having a biasing member providing a pressure proportional to the position of said biasing member, a brake torque demand lever operatively connected to said biasing member, and an output torque demand lever operatively connected to said biasing member to both increase the biasing force and demand pressures with increasing torque and brake demand.

8. In a hydraulic transmission;
(a) a fluid pump and motor unit having drive means, driven means, pump means driven by said drive means, motor means driving said driven means, power circuit means connecting said pump and motor means to supply fluid from said pump means to said motor means and return fluid from said motor means to said pump means, and pump displacement varying means to vary the displacement of said pump means;
(b) output torque demand means for controlling torque demand of an engine movable from a low to a high torque demand position for providing a torque demand signal proportional to torque demand;
(c) governor means connected to said pump means and responsive to the speed of said pump means for providing a speed signal proportional to pump speed;
(d) pump displacement control means connected to said pump displacement varying means, said governor means and said output torque demand means, and operative in response to operation of said output torque demand means to increase pump displacement with increasing speed signal as opposed by output torque demand signal to control the pump speed to provide optimum operating conditions for an engine driving the pump means.

9. In a hydraulic transmission;
(a) a fluid pump and motor unit having drive means, driven means, pump means driven by said drive means, motor means driving said driven means, power circuit means connecting said pump and motor means to supply fluid from said pump means to said motor means and return fluid from said motor means to said pump means, and pump displacement varying means to vary the displacement of said pump means;
(b) brake torque demand means for controlling the torque absorption by an engine from said driven means movable from a low to a high brake torque demand position for providing a brake torque demand signal proportional to brake torque demand;

(c) pressure signal means connected to said power circuit to provide a pressure signal proportional to power circuit return pressure;

(d) pump displacement control means connected to said pump displacement varying means, said brake torque demand means and said pressure signal means and operative in response to operation of said brake torque demand means to decrease pump displacement with said brake torque demand signal as opposed by said pressure signal to provide increased torque transmission from the driven mean to said drive means.

10. In a hydraulic transmission;
(a) a fluid pump and motor unit having drive means, driven means, pump means driven by said drive means, motor means driving said driven means, power circuit means connecting said pump and motor means to supply fluid from said pump means to said motor means and return fluid from said motor means to said pump means, and pump and motor displacement varying means to vary the displacement of said pump and motor means respectively;
(b) torque demand means for controlling torque demand of an engine movable from a low to a high torque demand position for providing a torque demand signal proportional to torque demand;
(c) governor means connected to said pump means and responsive to the speed of said pump means for providing a speed signal proportional to pump speed;
(d) pressure signal means connected to said power circuit to provide a pressure signal proportional to power circuit pressure;
(e) pump and motor displacement control means operatively connected to said torque demand means, said governor means and said pressure signal means operative to increase pump displacement with increasing torque demand and pump speed to a high value and to maintain motor displacement at a high value at a low range of driven member speeds and to maintain pump displacement at a high value and reduce motor displacement with increasing speed in a higher range of driven member speeds.

11. In a hydraulic transmission:
(a) a fluid pump and motor unit having drive means, driven means, pump means driven by said drive means, motor means driving said driven means, power circuit means connecting said pump and motor means to supply fluid from said pump means to said motor means and return fluid from said motor means to said pump means, and pump and motor displacement varying means to vary displacement of said pump and motor means respectively;
(b) torque demand means for controlling torque demand of an engine movable from a low to a high torque demand position for providing a torque demand signal proportional to torque demand;
(c) governor means connected to said pump means and responsive to the speed of said pump means for providing a speed signal proportional to pump speed;
(d) pressure signal means connected to said power circuit to provide a pressure signal proportional to power circuit pressure;
(e) pump displacement control means connected to said pump displacement varying means, said governor means and said torque demand means and operative to increase pump displacement to control the pump speed to provide optimum operating conditions for an engine driving the pump means;
(f) motor displacement control means connected to said motor displacement varying means, said torque demand means and said pressure signal means operative to reduce motor displacement to prevent the power circuit pressure from falling below a predetermined minimum.

12. The invention defined in claim 11 and said motor displacement control means preventing said circuit pressure from falling below a predetermined minimum value proportional to torque demand.

13. In a hydraulic transmission;
(a) a fluid pump and motor unit having drive means, driven means, pump means driven by said drive means, motor means driving said driven means, power circuit means connecting said pump and motor means to supply fluid from said pump means to said motor means and return fluid from said motor means to said pump means, and pump and motor displacement varying means to vary the displacement of said pump and motor means respectively;
(b) output torque demand means for controlling torque demand of an engine movable from a low to a high torque demand position for providing a torque demand signal proportional to torque demand;
(c) brake torque demand means for controlling the torque absorption by an engine from said driven means movable from a low to a high brake torque demand position for providing a brake torque demand signal proportional to brake torque demand;
(d) governor means connected to said pump means and responsive to the speed of said pump means for providing a speed signal proportional to pump speed;
(e) signal means connected to said power circuit to provide a pressure signal proportional to high power circuit pressure;
(f) pump displacement control means connected to said pump displacement varying means, said governor means, said output torque demand means, said brake torque demand means and said pressure signal means and operative in response to operation of said output torque demand means to increase pump displacement with increasing speed signal as opposed by output torque demand signal to control the pump speed to provide optimum operating conditions for an engine driving the pump means and operative in response to operation of said brake torque demand means to decrease pump displacement with said brake torque demand signal as opposed by said speed signal and said pressure signal to provide increased torque transmission from the driven means to said drive means;
(g) and motor displacement control means connected to said motor displacement varying means, said output torque demand means, said brake torque demand means, said governor means, and said signal means and being operative in response to said torque demand signal and said pressure signal to decrease motor displacement to maintain the high power circuit pressure at a minimum value and controlled by governor pressure to limit the maximum high circuit pressure and controlled by said brake torque demand signal to increase motor displacement.

14. In a hydraulic transmission;
(a) a fluid pump and motor unit having drive means, driven means, pump means driven by said drive means, motor means driving said driven means, power circuit means connecting said pump and motor means to supply fluid from said pump means to said motor means and return fluid from said motor means to said pump means, and motor displacement varying means to vary the displacement of said motor means;
(b) governor means connected to said pump means and responsive to the speed of said pump means for providing an excessive speed signal;
(c) signal means connected to said power circuit to provide a signal proportional to power circuit pressure;
(d) motor displacement control means connected to said motor displacement varying means, said governor means and said signal means operative to limit the power circuit pressure to prevent excessive pump speed.

15. The invention defined in claim 14 and said motor displacement control means being operative to limit the power circuit pressure to a minimum value.

16. The invention defined in claim 14 and said motor displacement control means being operative to limit the power circuit pressure to a maximum value.

17. The invention defined in claim 14 and said motor displacement control means being operative to limit the pump speed and provide hydraulic braking.

18. The invention defined in claim 14 and said motor displacement control means including a two part valve biased in extended position by said speed signal at normal speeds and permitted to contract at excessive speeds to vent the high pressure side of said power circuit means.

19. In a hydraulic transmission;
 (a) a fluid pump and motor unit having drive means, driven means, pump means driven by said drive means, motor means driving said driven means, power circuit means connecting said pump and motor means to supply fluid from said pump means to said motor means and return fluid from said motor means to said pump means, and motor displacement varying means to vary the displacement of said motor means;
 (b) torque demand means for controlling torque demand of an engine movable from a low to a high torque demand position for providing a torque demand signal proportional to torque demand;
 (c) signal means connected to said power circuit to provide a signal proportional to power circuit pressure;
 (d) motor displacement control means connected to said motor displacement varying means, said torque demand means and said signal means operative to reduce motor displacement to prevent the power circuit pressure from falling below a predetermined minimum.

20. The invention defined in claim 19 and
 (a) governor means connected to said pump means and responsive to the speed of said pump means for providing an excessive speed signal;
 (b) and said motor displacement control means also being connected to said governor means to reduce power circuit pressure in response to said excessive speed signal.

21. The invention defined in claim 19 and said motor displacement control means being operative to limit pressure in said power circuit means.

22. The invention defined in claim 19 and said motor displacement control means being operative to limit maximum pressure in said power circuit means.

23. The invention defined in claim 19 and said motor displacement control means being operative to limit minimum pressure in said power circuit means.

24. In a hydraulic transmission;
 (a) a fluid pump and motor unit having drive means, driven means, pump means driven by said drive means, motor means driving said driven means, power circuit means connecting said pump and motor means to supply fluid from said pump means to said motor means and return fluid from said motor means to said pump means, and motor displacement varying means to vary the displacement of said motor means;
 (b) signal means connected to said power circuit to provide a signal proportional to power circuit pressure;
 (c) a motor displacement control valve connected to said motor displacement varying means and said signal means operative to reduce motor displacement to prevent the power circuit pressure from falling below a predetermined minimum and rising above a predetermined maximum.

25. The invention defined in claim 24 and said motor displacement control valve being operative in response to excessive power circuit pressure to vent the high pressure portion of said power circuit means.

26. The invention defined in claim 24 and said motor displacement control valve being a two part valve retained in extended position by a biasing force and controlled by excessive power circuit pressure to vent the high pressure portion of said power circuit means.

27. In a power plant;
 (a) an engine;
 (b) hydraulic transmission means having drive means driven by said engine, driven means, pump means driven by said drive means, motor means driving said driven means, power circuit means connecting said pump and motor means to supply fluid from said pump means to said motor means and return fluid from said motor means to said pump means, and pump and motor displacement varying means to vary the displacement of said pump and motor means respectively;
 (c) torque demand means for controlling torque demand of said engine movable from a low to a high torque demand position for providing a torque demand signal proportional to torque demand;
 (d) governor means connected to said pump means and responsive to the speed of said pump means for providing a speed signal proportional to pump speed;
 (e) signal means connected to said power circuit to provide a pressure signal proportional to power circuit pressure;
 (f) pump and motor displacement control means operative in response to torque demand signal, speed signal, and pressure signal for controlling pump and motor displacement to provide optimum operating conditions for said engine.

28. The invention defined in claim 27 and said pump and motor displacement control means increasing said pump displacement to the maximum value and maintaining maximum motor displacement with increasing torque demand and engine speed in a first portion of the speed range of the driven means and then maintaining pump displacement at a maximum value and reducing motor displacement in a second speed range of the driven means to provide optimum engine operating conditions.

29. In a power plant;
 (a) an engine;
 (b) hydraulic transmission means having drive means driven by said engine, driven means, pump means driven by said drive means, motor means driving said driven means, power circuit means connecting said pump and motor means to supply fluid from said pump means to said motor means and return fluid from said motor means to said pump means, and pump and motor displacement varying means to vary the displacement of said pump and motor means respectively;
 (c) torque demand means for controlling torque demand of said engine movable from a low to a high torque demand position for providing a torque demand signal proportional to torque demand;
 (d) governor means connected to said pump means and responsive to the speed of said pump means for providing a speed signal proportional to pump speed;
 (e) signal means connected to said power circuit to provide a pressure signal proportional to power circuit pressure;
 (f) pump displacement control means connected to said pump displacement varying means, said governor means and said torque demand means and operative to increase pump displacement to control the pump speed to provide optimum operating conditions for said engine;
 (g) motor displacement control means connected to said motor displacement varying means, said torque demand means and said signal means operative to reduce motor displacement to prevent the power circuit pressure from falling below a predetermined minimum.

30. The invention defined in claim 29 and
(a) brake torque demand means for controlling the torque absorption of said engine from said driven means movable from a low to a high brake torque demand position for providing a brake torque demand signal proportional to brake torque demand;
(b) said pump displacement control means also being connected to said brake torque demand means and being operative to decrease pump displacement as opposed by said pressure signal to increase engine torque absorption with increasing brake torque demand.

31. The invention defined in claim 29 and said motor displacement control means including means to limit maximum power circuit pressure.

32. The invention defined in claim 29 and said motor displacement control means being connected to said governor means and being operative in response to a predetermined speed to reduce the higher pressure in said power circuit means to provide hydraulic braking.

33. The invention defined in claim 29 and,
(a) brake torque demand means for controlling the torque absorption by an engine from said driven means movable from a low to a high brake torque demand position for providing a brake torque demand signal proportional to brake torque demand;
(b) and said pump displacement control means being also connected to said brake torque demand means and said signal means and operative in response to operation of said brake torque demand means to decrease pump displacement with increasing brake torque demand signal as opposed by said speed signal means and said signal means to provide increased torque transmission from said driven means to said engine.

34. In a power plant;
(a) an engine;
(b) hydraulic transmission means having drive means driven by said engine, driven means, pump means driven by said drive means, motor means driving said driven means, power circuit means connecting said pump and motor means to supply fluid from said pump means to said motor means and return fluid from said motor means to said pump means, and pump displacement varying means to vary the displacement of said pump means;
(c) torque demand means for controlling torque demand of said engine movable from a low to a high torque demand position for providing a torque demand signal proportional to torque demand;
(d) governor means connected to said pump means and responsive to the speed of said pump means for providing a speed signal proportional to pump speed;
(e) pump displacement control means connected to said pump displacement varying means, said governor means and said torque demand means and operative to increase pump displacement to control the pump speed to provide optimum operating conditions for said engine.

35. In a power plant;
(a) an engine;
(b) hydraulic transmission means having drive means driven by said engine, driven means, pump means driven by said drive means, motor means driving said driven means, power circuit means connecting said pump and motor means to supply fluid from said pump means to said motor means and return fluid from said motor means to said pump means, and motor displacement varying means to vary the displacement of said motor means;
(c) torque demand means for controlling torque demand of said engine movable from a low to a high torque demand position for providing a torque demand signal proportional to torque demand;
(d) signal means connected to said power circuit to provide a signal proportional to power circuit pressure;
(e) motor displacement control means connected to said motor displacement varying means, said torque demand means and said signal means operative to reduce motor displacement to prevent the power circuit pressure from falling below a predetermined minimum.

36. The invention defined in claim 35 and
(a) governor means connected to said engine providing an engine overspeed signal;
(b) said motor displacement control means also being connected to said governor means and operative in response to engine overspeed signal to reduce flow in said power circuit means.

37. The invention defined in claim 35 and said motor displacement means being operative to limit the maximum pressure in said power circuit means.

38. In a drive combination for driving a load;
(a) an engine;
(b) a transmission having a drive shaft driven by said engine and a driven shaft connected to drive said load providing a plurality of drive ratios between said drive and driven shafts;
(c) brake control means operably connected to said transmission operable to connect said load to said engine to motor said engine to provide engine braking and operative to limit the speed at which the engine is motored.

39. The invention defined in claim 38 and said transmission being a hydrostatic transmission having high and low power passage means, and variable displacement pump and motor means and said brake control means controlling said variable displacement pump and motor means to drive the engine at a controlled motoring speed and operative to interconnect said high and low pressure passage means to limit engine speed and provide hydraulic braking.

40. In a hydraulic transmission; a fluid pump and motor unit having drive means, driven means, pump means driven by said drive means, motor means driving said driven means, power circuit means connecting said pump and motor means to supply fluid from said pump means to said motor means and return fluid from said motor means to said pump means; displacement varying means to vary the displacement of one of said pump and motor means; displacement control means to control said displacement varying means to provide variable torque ratio; brake torque demand means operative to provide a signal for operation of an output brake and said displacement control means being operative in response to said signal of said brake torque demand means to control said displacement control means to control the drive torque by brake demand.

41. The invention of claim 40 and said displacement varying means controlling the displacement of said pump means.

42. In a hydraulic transmission; a fluid pump and motor unit having drive means, driven means, pump means driven by said drive means, motor means driving said driven means, power circuit means connecting said pump and motor means to supply fluid from said pump means to said motor means and return fluid from said motor means to said pump means; displacement varying means to vary the displacement of one of said pump and motor means; displacement control means to control said displacement varying means to provide variable torque ratio; and flow responsive means in said power circuit operatively connected to said displacement control means for operation responsive to said flow responsive means.

43. The invention of claim 42 and said displacement varying means controlling the displacement of said motor means.

44. In a hydraulic transmission; a fluid pump and motor unit having drive means, driven means, pump means driven by said drive means, motor means driving said driven means, power circuit means connecting said pump and motor means to supply fluid from said pump means to said motor means and return fluid from said motor means to said pump means; displacement varying means to vary the displacement of one of said pump and motor means; displacement control means to control said displacement varying means to provide variable torque ratio; and torque demand means for providing a signal proportional to operator torque demand independent of load and said displacement control means being responsive to said torque demand means to control said displacement varying means.

45. The invention of claim 44 and said displacement varying means controlling the displacement of both said pump and motor means.

References Cited by the Examiner
UNITED STATES PATENTS

| | | | |
|---|---|---|---|
| 2,254,319 | 9/1941 | Rose | 60—53 |
| 2,580,946 | 1/1952 | Orshansky | 60—97 X |
| 2,817,954 | 12/1957 | Badalini | 60—53 |
| 2,854,820 | 10/1958 | Bousquet | 60—53 |
| 2,942,421 | 6/1960 | Hann | 60—19 |
| 3,054,263 | 9/1962 | Budzich | 60—53 |

EDGAR W. GEOGHEGAN, *Primary Examiner.*